(12) United States Patent
Lai

(10) Patent No.: US 9,689,560 B2
(45) Date of Patent: Jun. 27, 2017

(54) LED LIGHT BULB SIMULTANEOUSLY USING AS NIGHTLIGHT

(71) Applicant: Chung Ping Lai, Zhubei (TW)

(72) Inventor: Chung Ping Lai, Zhubei (TW)

( * ) Notice: Subject to any disclaimer, the term of this patent is extended or adjusted under 35 U.S.C. 154(b) by 88 days.

(21) Appl. No.: 14/731,423

(22) Filed: Jun. 5, 2015

(65) Prior Publication Data

US 2016/0356461 A1    Dec. 8, 2016

(51) Int. Cl.
| | |
|---|---|
| *F21V 19/00* | (2006.01) |
| *F21V 29/70* | (2015.01) |
| *F21V 23/00* | (2015.01) |
| *F21V 8/00* | (2006.01) |
| *F21Y 101/02* | (2006.01) |

(52) U.S. Cl.
CPC .......... *F21V 19/003* (2013.01); *F21V 23/009* (2013.01); *F21V 29/70* (2015.01); *G02B 6/0096* (2013.01); *F21Y 2101/02* (2013.01)

(58) Field of Classification Search
CPC ...... F21V 19/003; F21V 29/70; F21V 23/009; G02B 6/0096; F21Y 2102/02
USPC ............... 362/249.06, 249.02, 294, 235, 800
See application file for complete search history.

(56) References Cited

U.S. PATENT DOCUMENTS

| | | | | |
|---|---|---|---|---|
| 8,013,501 B2* | 9/2011 | Carroll | .................... | F21K 9/135 |
| | | | | 313/46 |
| 8,123,381 B1* | 2/2012 | Wray | ..................... | F21V 5/003 |
| | | | | 362/294 |
| 2012/0147624 A1* | 6/2012 | Li | ........................ | F21V 7/0008 |
| | | | | 362/609 |

* cited by examiner

*Primary Examiner* — Andrew Coughlin
*Assistant Examiner* — Jessica M Apenteng

(57) ABSTRACT

A LED light bulb simultaneously using as nightlight contains: a LED element, at least one LED filament, a base, a driving circuit, and a light guiding element. The base includes a hollow cavity for accommodating the driving circuit and LED element which electrically connects with the driving circuit, the base also includes an electrical fitting electrically connected with the driving circuit and a bulb holder. The light guiding element is made of photoconductive material and coupled with the base, and the light guiding element includes a light entering end corresponding to a light emitting end of the LED light to guide lights from the LED element. The at least one LED filament is electrically connected with the driving circuit and surrounds around the light guiding element, and the at least one LED filament is supported by the light guiding element to emit the lights.

5 Claims, 6 Drawing Sheets

LED LIGHT BULB SIMULTANEOUSLY USING AS NIGHTLIGHT

FIELD OF THE INVENTION

The present invention relates to a LED light bulb simultaneously using as nightlight.

BACKGROUND OF THE INVENTION

A conventional LED light bulb contains a LED element to emit lights, and a conventional nightlight illuminates lights at night. A combination (such as a ceiling light) of the LED light bulb and the nightlight illumes the lights and uses as the nightlight, but different bulbs with various brightness are arranged on the combination, for example, an incandescent bulb is fixed in the combination to illumes the lights, and a light bulb is mounted in the combination to use as the nightlight, wherein the combination contains a controller or a control circuit to control power on/off of the incandescent bulb and the light bulb. However, the combination cannot illuminates the lights and uses as the nightlight simultaneously.

The present invention has arisen to mitigate and/or obviate the afore-described disadvantages.

SUMMARY OF THE INVENTION

One aspect of the present invention is to provide a light bulb simultaneously using as nightlight which illuminates lights and uses as the nightlight.

Another aspect of the present invention is to provide a light bulb simultaneously using as nightlight which enhances heat dissipation of LED filament and light illumination.

To obtain the above aspects, a light bulb simultaneously using as nightlight provided by the present invention contains: a LED element, at least one LED filament, a base, a driving circuit, and a light guiding element.

The base includes a hollow cavity defined therein to accommodate the driving circuit and LED element which electrically connects with the driving circuit, the base also includes an electrical fitting electrically connected with the driving circuit and a bulb holder. The light guiding element is made of photoconductive material and is coupled with the base, and the light guiding element includes a light entering end corresponding to a light emitting end of the LED light to guide lights from the LED element. The at least one LED filament is electrically connected with the driving circuit and surrounds around an outer rim of the light guiding element, and the at least one LED filament is supported by the light guiding element to emit the lights.

The LED light bulb further contains a LED light board on which the LED element and the LED filament are connected, wherein the LED light board is configured on one end of the hollow cavity, the driving circuit is arranged on a driving circuit board and includes an input end electrically connecting with the electrical fitting, and one end of the driving circuit board is fitted with the LED light board, the driving circuit is electrically connected with the LED light board to drive the LED filament and the LED element.

The LED element and the LED filament are welded on the LED light board to electrically connect with the LED light board.

The light guiding element is columnar and is mounted on the one end of the hollow cavity of the base, the at least one LED filament surrounds around an outer rim of the light guiding element, a top end of each LED filament is retained into a recess on a top end of the light guiding element.

The LED light bulb further contains a lampshade, wherein the lampshade is hollow and includes an opening and at least one first heat dissipating orifice, wherein the opening of the lampshade is coupled with a top end of the base to accommodate the LED element, the at least one LED filament, and the light guiding element, and the base includes at least one second heat dissipating orifice to communicate with the lampshade.

A graphene layer is coated on one side of each LED filament facing to the light guiding element.

DETAILED DESCRIPTION OF THE PREFERRED EMBODIMENTS

Figure 1:
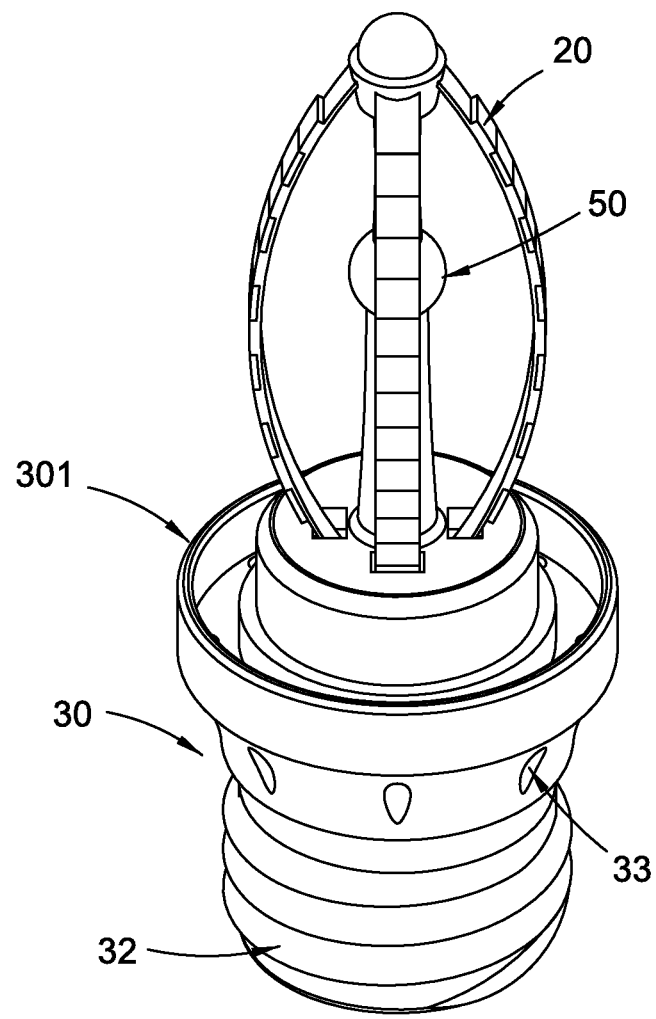
FIG. 1 is a perspective view showing the assembly of a LED light bulb simultaneously using as nightlight according to a first embodiment of the present invention.
Figure 2:
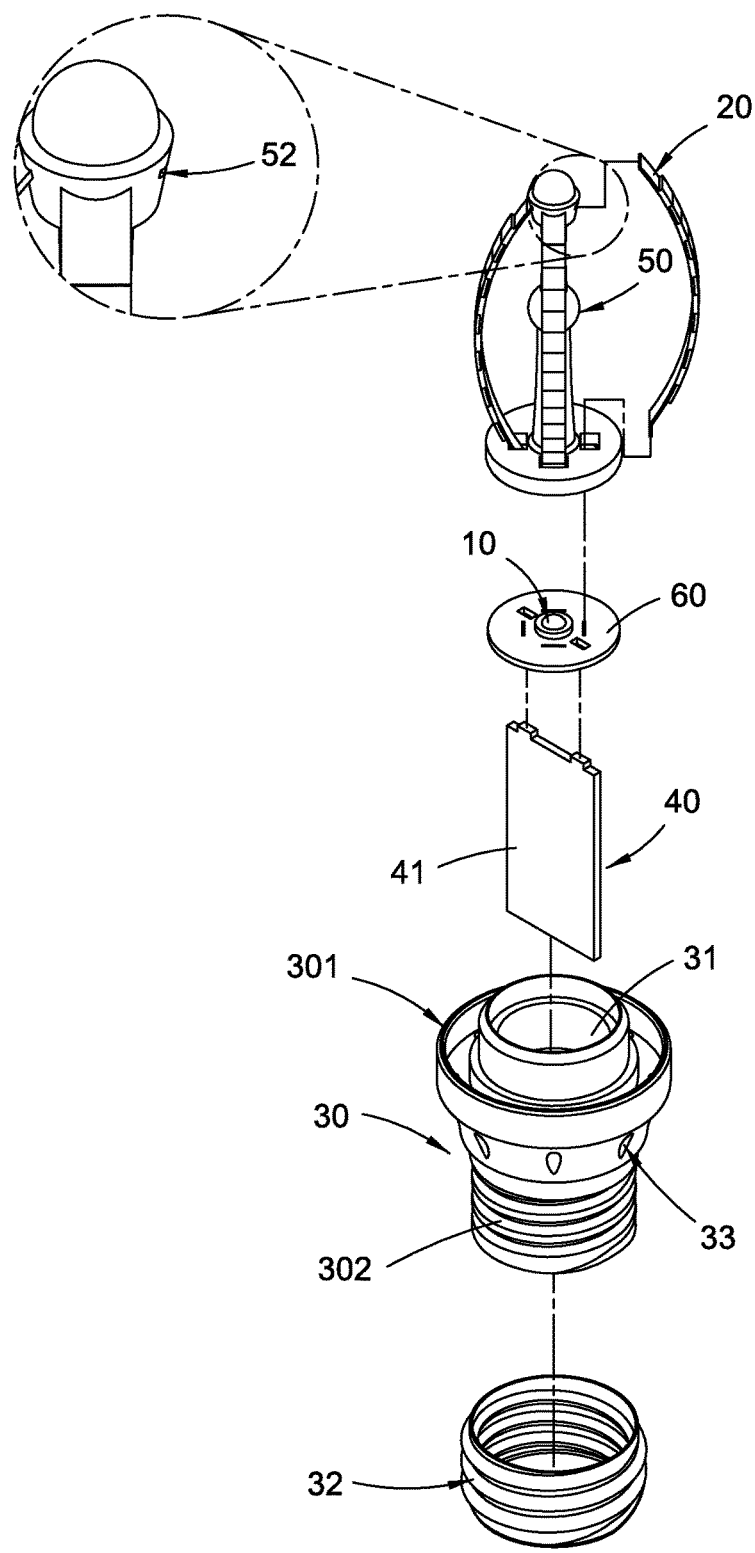
FIG. 2 is a perspective view showing the exploded components of the LED light bulb simultaneously using as nightlight according to the first embodiment of the present invention.

With reference to FIGS. 1 and 2, a LED light bulb simultaneously using as nightlight according to a first embodiment of the present invention comprises: a LED element 10, at least one LED filament 20, a base 30, a driving circuit 40, and a light guiding element 50.

The base 30 is formed in a hollow tube shape and includes a hollow cavity 31 defined therein to accommodate the driving circuit 40 and LED element 10. The base 30 also includes an electrical fitting 32 disposed on a bottom end 301 thereof and electrically connected with a bulb holder of various types and specifications to obtain an external power supply. For example, the electrical fitting 32 is any one of an Edison screw mount (such as E22, E26 or E27, as shown in FIG. 1), a bayonet mount (such as GU 10), and a bi-pin twist-lock mount (such as B22).

The LED light 10 is any one of white LED, RGB LED, other colors LED, and each LED filament 20 includes a plurality of elongated LED straps. In one embodiment, the plurality of elongated LED straps of the LED filament 20 are arranged on an elongated circuit board. In this embodiment, the LED light 10 and the at least one LED filament 20 are arranged on a LED light board 60, wherein the LED light board 60 is configured on one end of the base 30 relative to the electrical fitting 32, i.e., the LED light board 60 is configured on one end of the hollow cavity 31 of the base 30 relative to the electrical fitting 32. In this embodiment, the LED light board 60 includes a printed circuit formed thereon, and the LED element 10 and the LED filament 20 are welded on the LED light board 60 to electrically connect with the printed circuit of the LED light board 60.

The driving circuit 40 converts the external power supply into a driving power of the LED element 10 and the at least one LED filament 20, and the driving power outputs from an output end of the driving circuit 40. In this embodiment, the driving circuit 40 is arranged on a driving circuit board 41 and includes an input end electrically connecting with the electrical fitting 32 (for example, welding an electric wire on the electrical fitting 32), and one end of the driving circuit board 41 is fitted with the LED light board 60, the driving circuit 40 is electrically connected with the LED element 10 and the at least one LED filament 20 which are configured on a LED light board 60. In this embodiment, the driving circuit board 40 is welded with the printed circuit of the LED light board 60 to electrically connect with the printed circuit, such that the driving power of the driving circuit 40 drives the LED element 10 and the at least one LED filament 20 to emit lights.

The light guiding element 50 is made of photoconductive material (such as polycarbonate, PC) and is coupled with the base 30. The light guiding element 50 includes a light entering end 51 corresponding to a light emitting end of the LED light 10 to guide the lights from the LED element 10. In this embodiment, the light guiding element 50 is mounted on the one end of the hollow cavity 31 of the base 30 in a gluing manner or a screwing manner. In this embodiment, the light guiding element 50 matches with each LED filament 20. As shown in FIG. 1, the light guiding element 50 is columnar, and a number of the at least one LED filament 20 is four, the at least one LED filament 20 surrounds around an outer rim of the light guiding element 50, a top end of each LED filament 20 is retained into a recess 52 on a top end of the light guiding element 50, such that the at least one LED filament 20 is supported by the light guiding element 50 to emit the lights.

Figure 3:
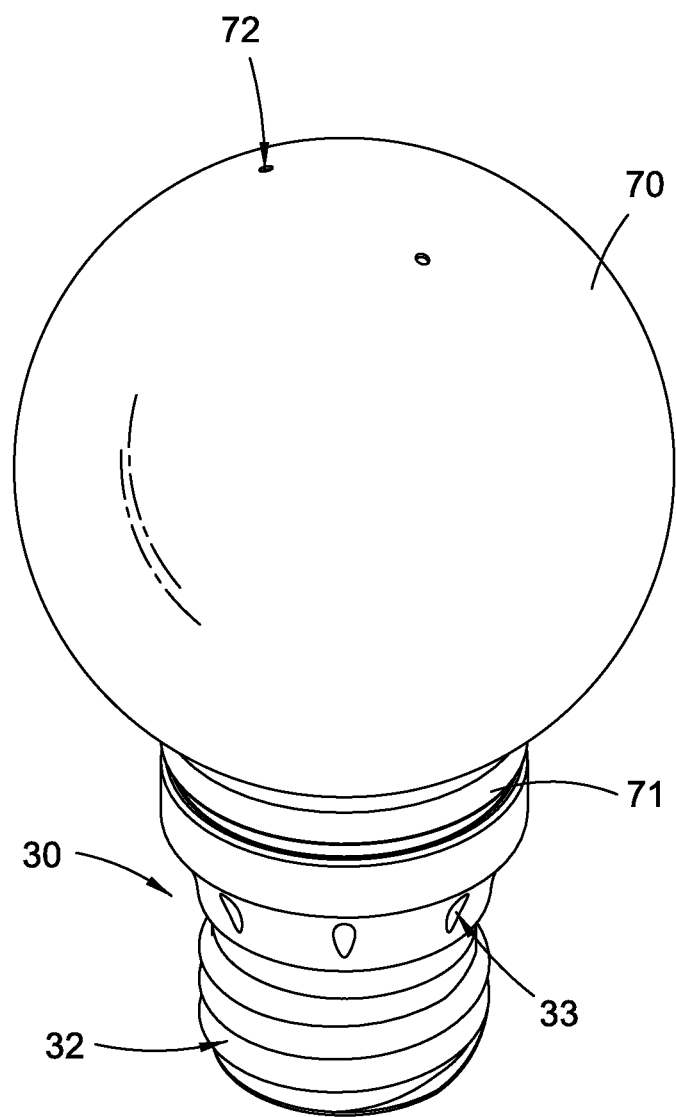
FIG. 3 is a perspective view showing the assembly of a LED light bulb simultaneously using as nightlight according to a second embodiment of the present invention.
Figure 4:
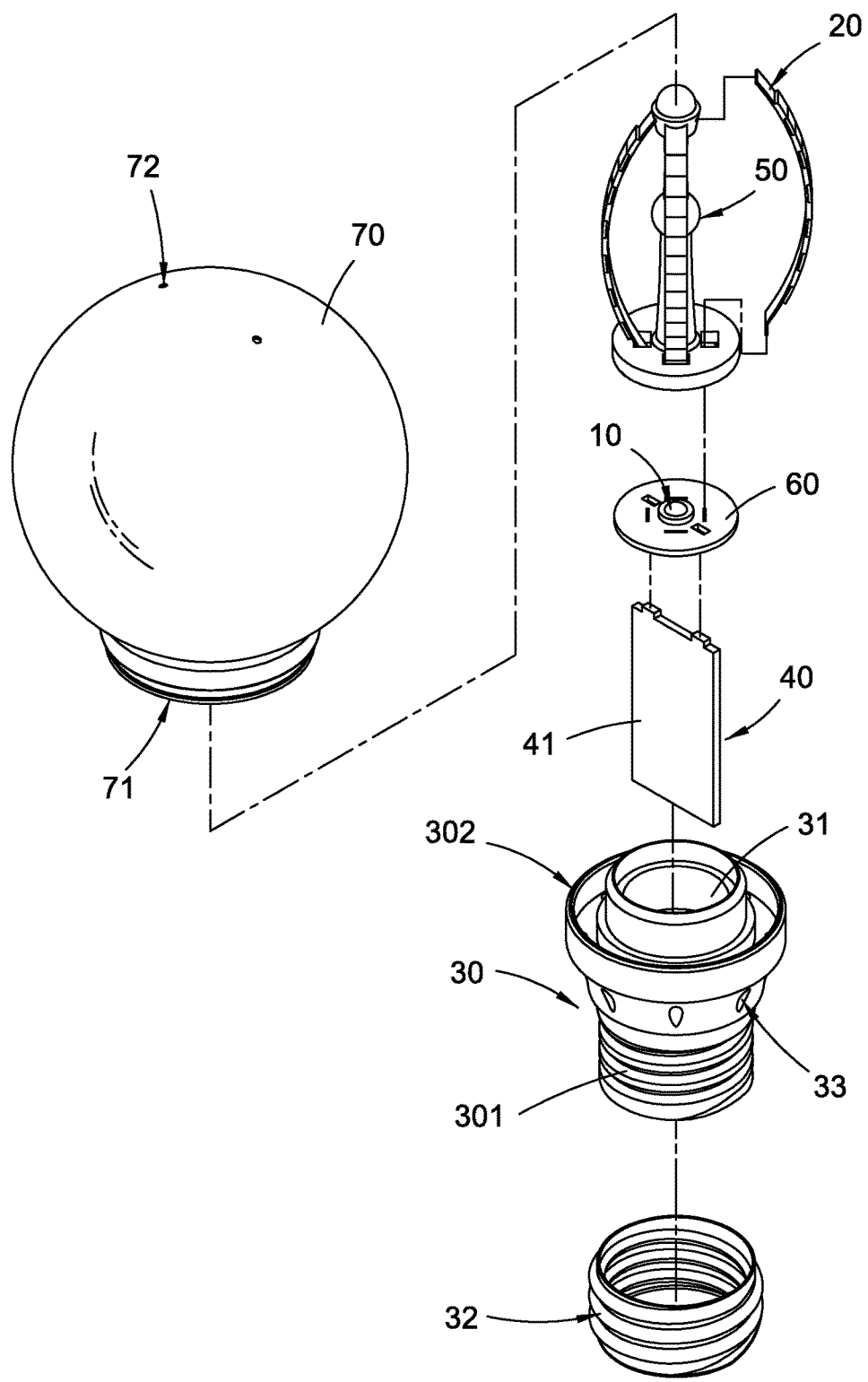
FIG. 4 is a perspective view showing the exploded components of the LED light bulb simultaneously using as nightlight according to the second embodiment of the present invention.
Figure 5:
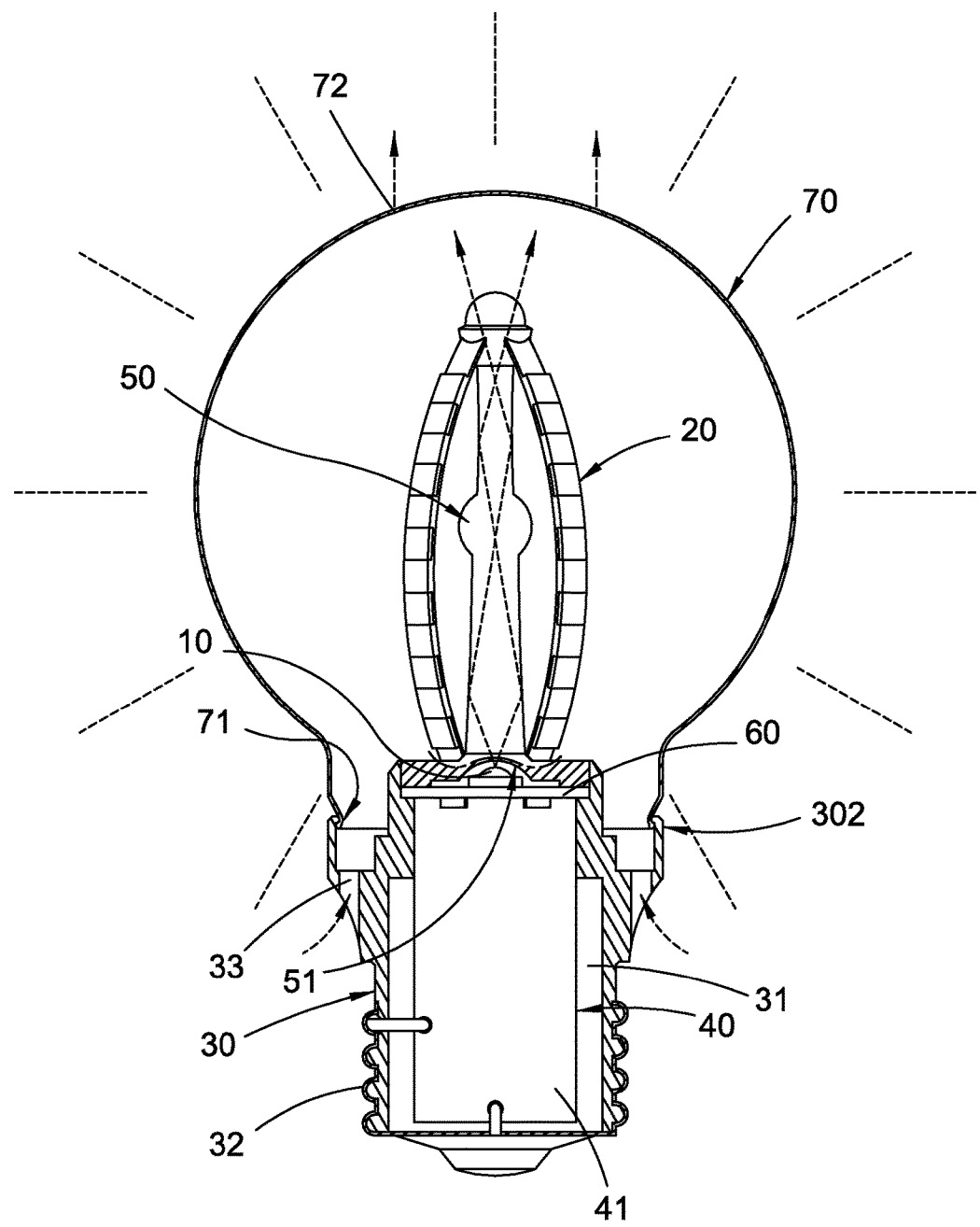
FIG. 5 is a cross sectional view showing the operation of the LED light bulb simultaneously using as nightlight according to the second embodiment of the present invention.

Referring to FIGS. 3 and 4, a difference of a LED light bulb of a second embodiment comprises: a lampshade 70 made of photoconductive material, the lampshade 70 being hollow and including an opening 71 and at least one first heat dissipating orifice 72, wherein the lampshade 70 is in connection with the base 30 to accommodate the LED element 10, the at least one LED filament 20, and the light guiding element 50. In this embodiment, the opening 71 of the lampshade 70 is coupled with a top end 302 of the base 30, and the base 30 includes at least one second heat dissipating orifice 33 to communicate with the lampshade 70, such that heat produces as the LED element 10 and the at least one LED filament 20 emit the lights, and then it heats the lampshade 70, thereafter cold air is guided into the lampshade 70 from the at least one second heat dissipating orifice 33, and hot air discharges out of the at least one first heat dissipating orifice 72 (as illustrated in FIG. 5), thus circulating the cold air and the hot air in the LED light bulb efficiently.

Figure 6:
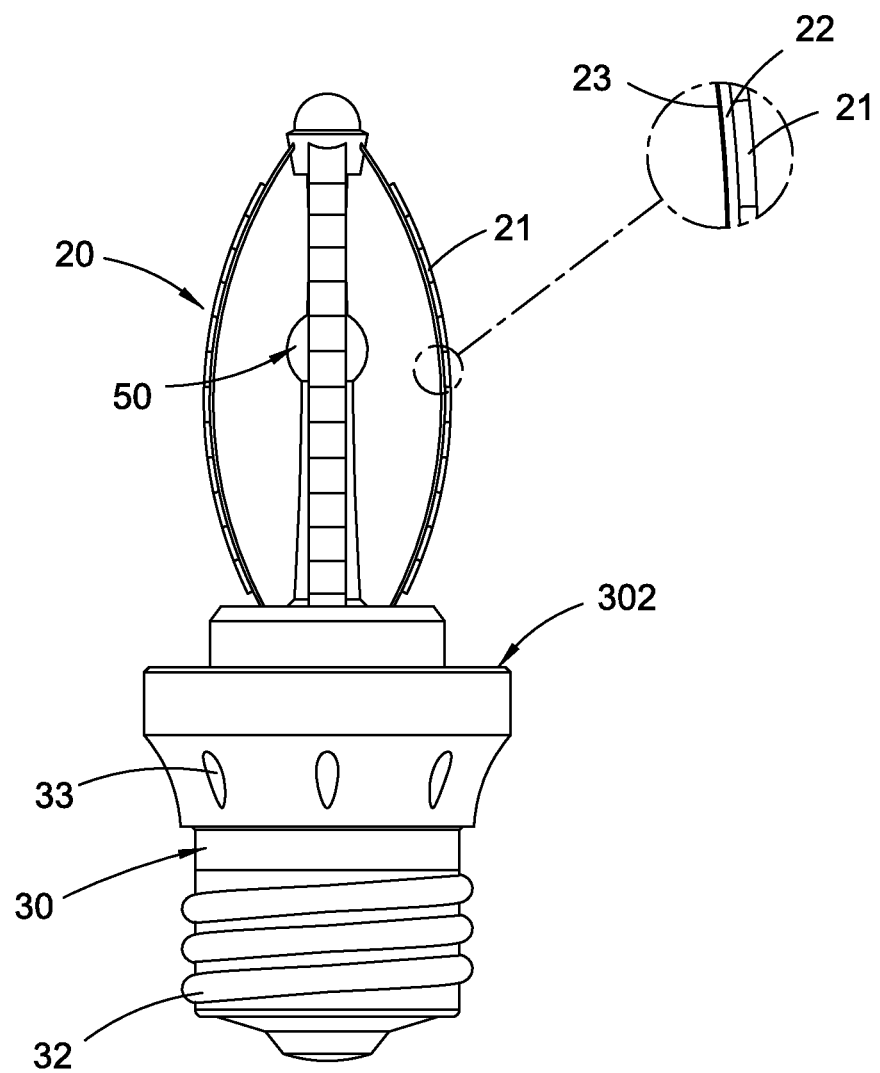
FIG. 6 is a side plane view showing the assembly of a LED light bulb simultaneously using as nightlight according to a third embodiment of the present invention.

As shown in FIG. 6, in a third embodiment, each LED filament 20 includes plural light-emitting diodes 21 and an elongated substrate 22 (i.e., a printed circuit board), wherein the plural light-emitting diodes 21 are arranged on a first side of the elongated substrate 22, and a graphene layer 23 is coated on a second side of the elongated substrate 22 facing to the light guiding element 50 to enhance heat dissipation of the LED filament 20 and light illumination.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A LED light bulb simultaneously using as nightlight comprising: a LED element, at least one LED filament, a base, a driving circuit, a light guiding element, and a LED light board on which the LED element and the at least one LED filament are connected;
   wherein the base includes a hollow cavity defined therein to accommodate the driving circuit and LED element which electrically connects with the driving circuit, the base also includes an electrical fitting electrically connected with the driving circuit and a bulb holder, the light guiding element is made of photoconductive material and is coupled with the base, the light guiding element includes a light entering end corresponding to a light emitting end of the LED light to guide lights from the LED element, the at least one LED filament is electrically connected with the driving circuit and surrounds around an outer rim of the light guiding element, and the at least one LED filament is supported by the light guiding element to emit the lights;
   wherein the LED light board is configured on one end of the hollow cavity, the driving circuit is arranged on a driving circuit board and includes an input end electrically connecting with the electrical fitting, and one end of the driving circuit board is fitted with the LED light board, the driving circuit is electrically connected with the LED light board to drive the LED filament and the LED element.

2. The LED light bulb simultaneously using as nightlight as claimed in claim 1, wherein the LED element and the LED filament are welded on the LED light board to electrically connect with the LED light board.

3. The LED light bulb simultaneously using as nightlight as claimed in claim 1, wherein the light guiding element is columnar and is mounted on the one end of the hollow cavity of the base, the at least one LED filament surrounds around an outer rim of the light guiding element, a top end of each LED filament is retained into a recess on a top end of the light guiding element.

4. The LED light bulb simultaneously using as nightlight as claimed in claim 1 further comprising a lampshade, wherein the lampshade is hollow and includes an opening and at least one first heat dissipating orifice, wherein the opening of the lampshade is coupled with a top end of the base to accommodate the LED element, the at least one LED filament, and the light guiding element, and the base includes at least one second heat dissipating orifice to communicate with the lampshade.

5. The LED light bulb simultaneously using as nightlight as claimed in claim 1, wherein a graphene layer is coated on one side of each LED filament facing to the light guiding element.

\* \* \* \* \*